US009092771B2

(12) United States Patent
Adams et al.

(10) Patent No.: US 9,092,771 B2
(45) Date of Patent: *Jul. 28, 2015

(54) METHOD AND APPARATUS FOR CONTACTLESS PAYMENT AUTHENTICATION

(71) Applicant: BlackBerry Limited, Waterloo (CA)

(72) Inventors: Neil Patrick Adams, Waterloo (CA); Michael Kenneth Brown, Kitchener (CA); Michael S. Brown, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,822

(22) Filed: Dec. 27, 2013

(65) Prior Publication Data
US 2014/0114858 A1 Apr. 24, 2014

Related U.S. Application Data

(63) Continuation of application No. 13/584,096, filed on Aug. 13, 2012, now Pat. No. 8,640,950, which is a continuation of application No. 12/644,577, filed on Dec. 22, 2009, now Pat. No. 8,240,560, which is a continuation of application No. 11/319,783, filed on Dec. 29, 2005, now Pat. No. 7,641,111.

(51) Int. Cl.
*G06K 5/00* (2006.01)
*G06Q 20/32* (2012.01)
(Continued)

(52) U.S. Cl.
CPC .......... *G06Q 20/3227* (2013.01); *G06Q 20/105* (2013.01); *G06Q 20/204* (2013.01); *G06Q 20/32* (2013.01); *G06Q 20/327* (2013.01); *G06Q 20/352* (2013.01); *G06Q 50/265* (2013.01)

(58) Field of Classification Search
USPC ............................................. 235/380; 705/39
See application file for complete search history.

(56) References Cited

U.S. PATENT DOCUMENTS 4,945,556 A 7/1990 Namekawa
6,950,647 B2 9/2005 Ko
(Continued)

FOREIGN PATENT DOCUMENTS

WO 02/49322 6/2002
WO 0249322 6/2002
WO 2004105359 6/2002

OTHER PUBLICATIONS

Search Report, EP Application No. 05258098.2, dated Feb. 23, 2006.
(Continued)

*Primary Examiner* — Ahshik Kim
(74) *Attorney, Agent, or Firm* — Ridout & Maybee LLP

(57) ABSTRACT

A computer-readable medium contains computer-executable instructions. When the instructions are performed by a processor in an electronic device having embedded contactless payment functionality, the performance of the instructions causes the processor to provide data for a contactless payment transaction. In particular, various systems and methods utilize authentication schemes that already exist on a device in which the contactless payment functionality is embedded. One example of such authentication schemes is the use of password protection to lock or unlock the device in which the contactless payment functionality is embedded. Using the password protection functionality may provide varying levels of authentication protection based on the desires of the user. A number of exemplary uses of such a method and apparatus are disclosed herein.

30 Claims, 6 Drawing Sheets

(51) Int. Cl.
*G06Q 20/10* (2012.01)
*G06Q 20/20* (2012.01)
*G06Q 20/34* (2012.01)
*G06Q 50/26* (2012.01)

(56) References Cited

U.S. PATENT DOCUMENTS

| | | | |
|---|---|---|---|
| 7,240,846 B2 | 7/2007 | Arisawa et al. | |
| 7,258,267 B2 | 8/2007 | Choi | |
| 7,350,701 B2 | 4/2008 | Miyashita | |
| 7,641,111 B2 | 1/2010 | Adams et al. | |
| 8,240,560 B2 | 8/2012 | Adams et al. | |
| 8,640,950 B2 * | 2/2014 | Adams et al. | 235/380 |
| 2001/0016486 A1 | 8/2001 | Ko | |
| 2003/0050896 A1 | 3/2003 | Wiederin | |
| 2003/0055735 A1 | 3/2003 | Cameron et al. | |
| 2004/0026496 A1 | 2/2004 | Zuili | |
| 2005/0097038 A1 | 5/2005 | Yu et al. | |
| 2005/0182674 A1 | 8/2005 | Yeo | |
| 2005/0274796 A1 | 12/2005 | Miyashita | |
| 2007/0179885 A1 | 8/2007 | Bird et al. | |

OTHER PUBLICATIONS

Examiners Report Dated Mar. 26, 2014, Canadian Application No. 2,572,069.

* cited by examiner

METHOD AND APPARATUS FOR CONTACTLESS PAYMENT AUTHENTICATION

CROSS REFERENCE TO RELATED APPLICATION

The present application is a continuation application of U.S. application Ser. No. 13/584,096, filed Aug. 13, 2012, the contents of which are incorporated herein by reference in their entirety. U.S. application Ser. No. 13/584,096 is a continuation application of U.S. application Ser. No. 12/644,577, now U.S. Pat. No. 8,240,560, filed Dec. 22, 2009, the contents of which are also incorporated herein by reference in their entirety. U.S. application Ser. No. 12/644,577 is a continuation application of U.S. application Ser. No. 11/319,783, now U.S. Pat. No. 7,641,111, filed Dec. 29, 2005, the contents of which are also incorporated herein by reference in their entirety.

FIELD

The present invention relates generally to a method and apparatus for providing increased security for users of electronic equipment, such as, for example, mobile wireless communications devices, that include embedded circuits for enabling use with contactless payment systems. In particular, the disclosure is directed to methods and apparatus for providing authentication capability for devices that include contactless payment functionality.

BACKGROUND

Contactless payment systems are gaining widespread acceptance by retailers and are becoming increasingly popular among consumers. In contactless payment systems, also known as "Tap-and-Go" or "Pay and Wave" payment systems, consumers use a payment card or other device that is equipped with an integrated chip and antenna that securely communicates consumer account information via a radio frequency communication link to a retailer's payment terminal. The payment terminal then connects to an appropriate financial network or other back-end processing system via, for example, a communication network, to authorize the transaction. Once authorized, the consumer completes the transaction. This scheme of contactless payment accomplishes a transaction in a fraction of the time required by cash, traditional credit cards or debit card transactions, which require a card to be swiped through a reader.

Contactless payment devices typically include a chip and antenna. The chip includes, for example, consumer account information. When the chip is brought into close enough proximity to a suitable reader, the antenna will be activated and will transmit the consumer account information residing on the chip to the reader. Of course, to avoid errors and ensure that the reader is communicating with the correct device, the proximity of the contactless payment device to the reader required to activate the antenna is typically on the order of a very few inches at most.

The chip and antenna of known contactless payment systems may be incorporated into any of a number of form factors that are convenient for consumers. For example, these chips and antenna have been embedded into key fobs, contactless smart cards, and even cellular telephones. In the future, these chips and antenna may be incorporated into any of a variety of forms due to their small size. Because mobile wireless communications devices, such as, for example, cellular telephones, personal digital assistants, mobile e-mail devices, and the like, are being carried by more and more consumers, inclusion of the contactless payment system chips and antenna in these devices is becoming increasingly common.

However, such contactless payment systems suffer from a serious disadvantage that may result in unauthorized use of the device and significant loss of money or credit. For example, if a contactless payment device is lost, there is no quick and reliable way to avoid unauthorized use of the contactless payment device before the issuer of the account associated with the device is contacted by the user and the system cancels use of that particular device. In particular, there is no known solution for ensuring that the user of the contactless payment device is authorized to make payment using the contactless payment device. Of course, one solution may be to have the user enter a personal identification number or other like code at the point of sale to ensure that the user is authorized to make payment using the contactless device. This may be accomplished, for example, via a keypad associated with a contactless payment device reader. However, this solution may be somewhat at odds with the advantages associated with the use of such contactless payment systems in which speed and ease of use are paramount. Entering identifying information would slow the transaction speed down, and would not result in any more convenience than that associated with swiping a conventional credit or debit card to read its magnetic stripe.

Therefore, what is needed is a transparent way to authenticate a user of a contactless payment device that maintains the speed and convenience of contactless payment, while maintaining an acceptable level of security to ensure that unauthorized use of the device is restricted.

SUMMARY

In view of the foregoing, we have now identified an efficient, accurate and easy to implement system and method for authenticating contactless payments that is user friendly and transparent to the overall contactless payment system, yet maintains the convenience and transaction speed that make such contactless payment systems advantageous and desirable.

According to an exemplary embodiment, the contactless payment system chip may be integrated with the security system of the device into which it is integrated, such as, for example, a mobile wireless communications device. The mobile wireless communication device must have the ability to enable and/or disable use of the payment functionality of the contactless payment system chip. For example, the mobile wireless communication device may include password functionality that is typically used to enable use of the mobile wireless communications device for features other than contactless payment, such as, for example, locking the mobile wireless communication device keypad. If there is no password set for the mobile wireless communication device, then the payment functionality of the contactless payment chip is always enabled for use. However, if the password of the mobile electronic communication device is set, use of the payment functionality of the contactless payment chip may be disabled when the mobile wireless communication device is locked. If the mobile wireless communication device is in an unlocked condition, the payment functionality of the contactless payment chip is enabled for use. In the situation where contactless payment is attempted, but the mobile wireless communication device is locked, the user may be prompted by any number of means, such as, for example, vibration, tone or message on a screen of the mobile wireless communication device, or an indication from the contactless payment reader, to enter the appropriate password to unlock the device and enable contactless payment. If the correct password is not entered for a predetermined number of attempts, use of the payment functionality of the contactless payment chip is disabled and the transaction is not completed.

In another embodiment, where the user may prefer a very rigorous and highly secure solution, entry of the password of the device in which the contactless payment chip is integrated, such as, for example, a mobile wireless communication device, may be required whenever a contactless payment transaction is attempted, regardless of the locked or unlocked condition of the device in which the contactless payment chip is integrated.

In yet another advantageous embodiment, the user may be required to enter a password to enable use of the payment functionality of the contactless payment chip once every predetermined number of contactless payment transactions. For example, the device may be set to request entry of a password upon the occurrence of every tenth contactless payment transaction. The device keeps track of the number of contactless payment transactions. Upon detection of the tenth attempted transaction, the device will prompt the user for entry of the appropriate password. If the correct password is entered, the transaction is enabled, and the counter which keeps track of the number of attempted contactless payment transactions is reset to zero. If the correct password is not entered after a predetermined number of attempts, use of the payment functionality of the contactless payment chip is disabled. This exemplary embodiment reduces the amount of potential loss, while maintaining a relatively high level of convenience for the user.

In another exemplary embodiment, contactless payment functionality may be associated with a so-called "smart card." In this example, the smart card may include a chip that provides contactless payment functionality. The smart card having contactless payment functionality may be inserted into a smart card reader that is in communication with, for example, a mobile wireless communication device via a wireless connection, such as, for example, a Bluetooth™ connection. Additionally, the smart card reader may be a portable reader that is wearable by the user via, for example, a lanyard, or the like. When the smart card reader containing the smart card (including contactless payment functionality) is brought in proximity of a contactless payment reader, use of the contactless payment functionality may be controlled by the mobile wireless communications device in a manner similar to that described above, by controlling the smart card reader via wireless connection between the smart card reader and the mobile wireless communication device. For example, the mobile wireless communication device may include password functionality that is typically used to enable use of the mobile wireless communications device for features other than contactless payment, such as, for example, locking the mobile wireless communication device keypad. If there is no password set for the mobile wireless communication device, then the contactless payment chip is always enabled for use. However, if the password of the mobile electronic communication device is set, use of the payment functionality of the contactless payment chip may be disabled via the smart card reader when the mobile wireless communication device is locked. If the mobile wireless communication device is in an unlocked condition, the payment functionality of the contactless payment chip is enabled for use by the smart card reader. In the situation where contactless payment is attempted, but the mobile wireless communication device is locked, the user may be prompted by any number of means, such as, for example, vibration, tone or message on a screen of the mobile wireless communication device, or an indication from the contactless payment reader, to enter the appropriate password to unlock the device via the smart card reader and enable contactless payment. If the correct password is not entered for a predetermined number of attempts, use of the payment functionality of the contactless payment chip is disabled and the transaction is not completed. It will be understood that other security schemes using the security features of the mobile wireless communication device may be used, and other uses of the password functionality, such as those described above in connection with different exemplary embodiments may be used.

BRIEF DESCRIPTION OF THE DRAWINGS

These and other embodiments together with their attendant advantages are described herein with reference to the following drawings in which like reference numerals refer to like elements, and wherein.

DETAILED DESCRIPTION OF THE EMBODIMENTS

Figure 1:
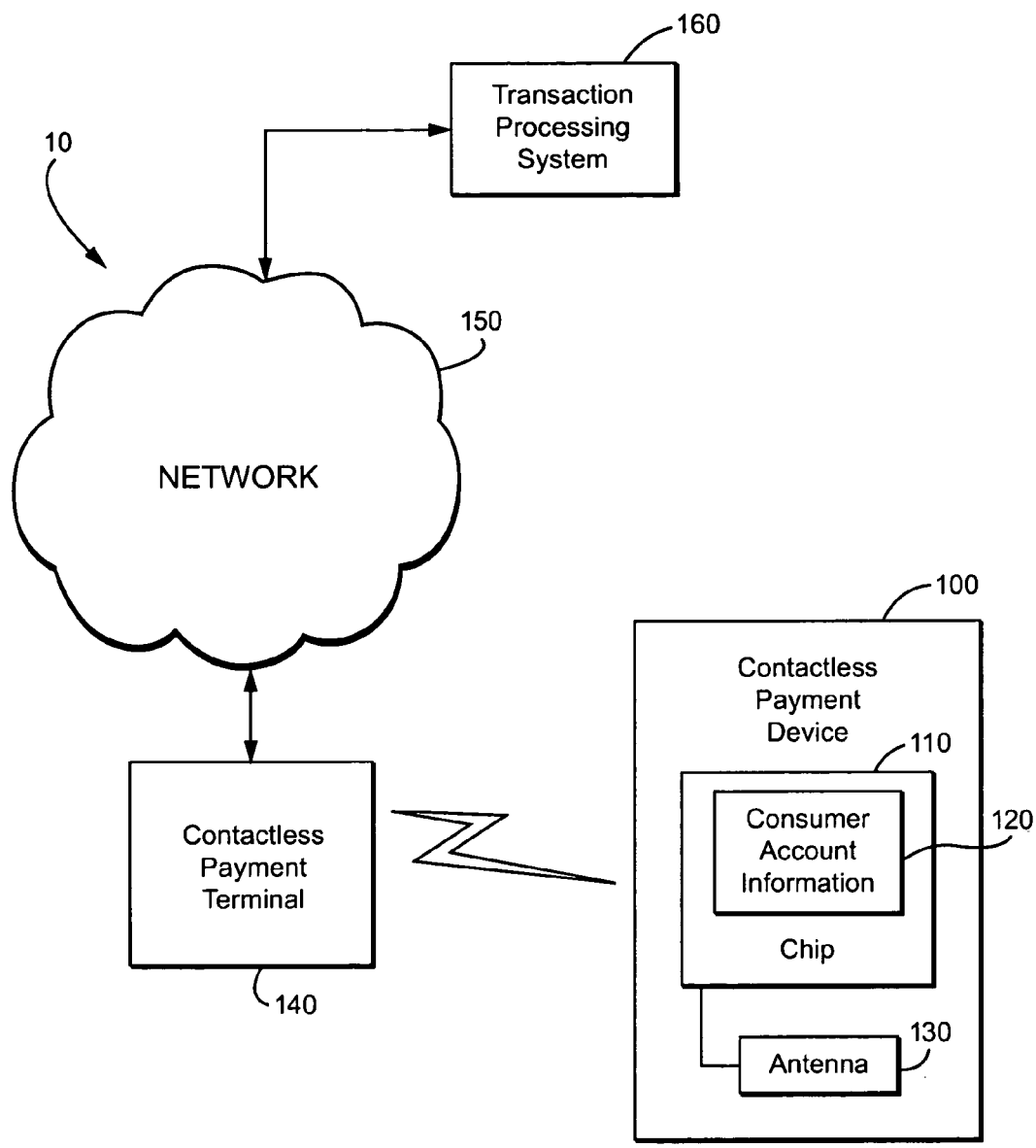
FIG. 1 is a block diagram illustrating an exemplary contactless payment system.

FIG. 1 is a block diagram illustrating an exemplary contactless payment system 10. According to this illustrative example, a contactless payment device 100, such as, for example, a contactless payment card, key fob, cellular telephone, mobile wireless communication device, or the like, is equipped with an integrated contactless payment chip 110 and radio-frequency antenna 130. The chip 110 includes consumer account information 120 that can be used by the system 10 to enable contactless payment transactions.

In operation, when a user desires to make a contactless payment, the user brings the contactless payment device 100 into close proximity of a contactless payment terminal or reader 140. The contactless payment terminal or reader 140 emits a signal that will activate the antenna 130 associated with the contactless payment chip 110 of the contactless payment device 100. Upon activation, the antenna 130 transmits the consumer account information 120 embedded in the contactless payment chip 110 to the contactless payment terminal or reader 140. Upon receipt of the consumer account information 120 from the contactless payment device 100, the contactless payment terminal or reader 140 transmits the consumer account information 120 to a transaction processing system 160 via a communications network 150, such as, for example, a secure communications or computer network.

The transaction processing system 160 verifies the consumer account information 120 received from the contactless payment terminal or reader 140. The transaction processing system 160 then provides an indication to the contactless payment terminal or reader 140 via, for example, the communication network 150, whether the transaction is approved or declined.

Figure 2:
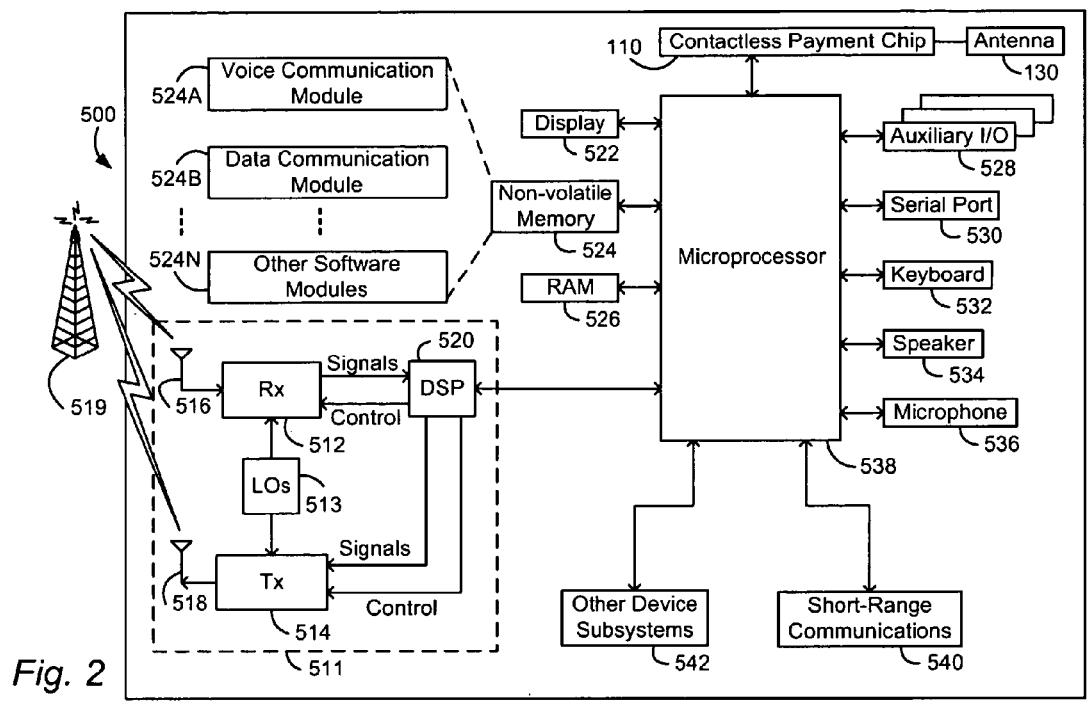
FIG. 2 is a block diagram of a wireless mobile communication device as an example of an electronic device having an integrated contactless payment chip and antenna.

FIG. 2 is a block diagram of an exemplary wireless mobile communication device as an example of an electronic device in which a contactless payment chip 110 and antenna 130 may be embedded and/or integrated for providing contactless payment functionality. However, it should be understood that the systems and methods disclosed herein may be used with many different types of devices, such as personal digital assistants (PDAs), cellular telephones, or the like.

The mobile device 500 is preferably a two-way communication device having at least voice and data communication capabilities. The mobile device 500 preferably has the capability to communicate with other computer systems on the Internet. Depending on the functionality provided by the mobile device, the mobile device may be referred to as a data messaging device, a two-way pager, a cellular telephone with data messaging capabilities, a wireless Internet appliance, or a data communication device (with or without telephony capabilities). As mentioned above, such devices are referred to generally herein as mobile devices.

The mobile device 500 includes a transceiver 511, a microprocessor 538, a display 522, non-volatile memory 524, random access memory (RAM) 526, auxiliary input/output (I/O) devices 528, a serial port 530, a keyboard 532, a speaker 534, a microphone 536, a short-range wireless communications sub-system 540, and may also include other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the non-volatile memory 524, the mobile device 500 includes a plurality of software modules 524A-524N that can be executed by the microprocessor 538 (and/or the DSP 520), including a voice communication module 524A, a data communication module 524B, and a plurality of other operational modules 524N for carrying out a plurality of other functions. The mobile device 500 may also include a contactless payment chip 110 and associated antenna 130 that may optionally be operatively coupled to the microprocessor 538 of the mobile device 500 to provide contactless payment functionality.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 2 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications or the mobile device 500 is enabled for communications on more than one network 519, then a plurality of LOs 513 can be used to generate frequencies corresponding to those used in the network 519. Although two antennas 516, 518 are depicted in FIG. 2, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., is dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Communication network access requirements for the mobile device 500 also vary depending upon the type of network 519. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 is unable to carry out functions involving communications over the network 519, other than any legally required operations, such as "911" emergency calling.

After any required network registration or activation procedures have been completed, the mobile device 500 is able to send and receive communication signals, preferably including both voice and data signals, over the network 519. Signals received by the antenna 516 from the communication network 519 are routed to the receiver 512, which provides for signal amplification, frequency down conversion, filtering, channel selection, etc., and may also provide analog to digital conversion. Analog to digital conversion of the received signal allows more complex communication functions, such as digital demodulation and decoding, to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown for both voice and data communications, in alternative embodiments, the mobile device 500 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. High-level communication applications, including the voice communication application 524A, and the data communication application 524B are stored in the non-volatile memory 524 for execution by the microprocessor 538. For example, the voice communication module 524A may provide a high-level user interface operable to transmit and receive voice calls between the mobile device 500 and a plurality of other voice devices via the network 519. Similarly, the data communication module 524B may provide a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, RAM 526, auxiliary I/O devices 528, serial port 530, keyboard 532, speaker 534, microphone 536, a short-range communications subsystem 540 and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O devices 528, keyboard 532, speaker 534, or microphone 536. Additionally, the microprocessor 538 is capable of running a variety of applications that may be present in the device non-volatile memory 524, including applications that have access to various privileges, as will be described in more detail herein.

Some of the subsystems shown in FIG. 2 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions. Another example of an application that may be controlled by the microprocessor 538 of the mobile device 500 is the password protection of the device 500, wherein operation of the device or keyboard may be made dependent upon the locking or unlocking of the device 500 using, for example, a password entered via the keyboard 532, or the like.

Operating system software used by the microprocessor 538 is preferably stored in a persistent store such as the non-volatile memory 524. In addition to the operating system and communication modules 524A-N, the non-volatile memory 524 may include a file system for storing data. The non-volatile memory 524 may also include data stores for owner information and owner control information. The operating system, specific device applications or modules, or parts thereof, may be temporarily loaded into a volatile store, such as RAM 526 for faster operation. Moreover, received communication signals may also be temporarily stored to RAM 526, before permanently writing them to a file system located in the non-volatile memory 524. The non-volatile memory 524 may be implemented, for example, with Flash memory, non-volatile RAM, or battery backed-up RAM.

An exemplary application module 524N that may be loaded onto the mobile device 500 is a PIM application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The non-volatile memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 is manually synchronized with a host system by placing the mobile device 500 in an interface cradle, which couples the serial port 530 of the mobile device 500 to a serial port of the host system. The serial port 530 may also be used to insert owner information and owner control information onto the mobile device 500 and to download other application modules 524N for installation on the mobile device 500. This wired download path may further be used to load an encryption key onto the mobile device 500 for use in secure communications, which is a more secure method than exchanging encryption information via the wireless network 519.

Owner information, owner control information and additional application modules 524N may be loaded onto the mobile device 500 through the network 519, through an auxiliary I/O subsystem 528, through the short-range communications subsystem 540, or through any other suitable subsystem 542, and installed by a user in the non-volatile memory 524 or RAM 526. Such flexibility in application installation increases the functionality of the mobile device 500 and may provide enhanced on-device functions, communication-related functions, or both. For example, secure communication applications may enable electronic commerce functions and other such financial transactions to be performed using the mobile device 500.

When the mobile device 500 is operating in a data communication mode, a received signal, such as a text message or a web page download, will be processed by the transceiver 511 and provided to the microprocessor 538, which preferably further processes the received signal for output to the display 522, or, alternatively, to an auxiliary I/O device 528. Owner information, owner control information, commands or requests related to owner information or owner control information, and software applications received by the transceiver 511 are processed as described above. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with the plurality of auxiliary I/O devices 528, which may include a thumbwheel input device, a touchpad, a variety of switches, a rocker input switch, etc. The composed data items input by the user are then transmitted over the communication network 519 via the transceiver 511.

When the mobile device 500 is operating in a voice communication mode, the overall operation of the mobile device 500 is substantially similar to the data mode, except that received signals are output to the speaker 534 and voice signals for transmission are generated by a microphone 536. In addition, the secure messaging techniques described above might not necessarily be applied to voice communications. Alternative voice or audio I/O devices, such as a voice message recording subsystem, may also be implemented on the mobile device 500. Although voice or audio signal output is accomplished through the speaker 534, the display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 is also be included in the mobile device 500. For example, the subsystem 540 may include an infrared device and associated circuits and components, or a Bluetooth or 802.11 short-range wireless communication module to provide for communication with similarly-enabled systems and devices. Thus, owner information insertion, owner control information insertion, and application loading operations as described above may be enabled on the mobile device 500 via the serial port 530 or other short-range communications subsystem 540.

The exemplary mobile device 500 described herein may also include an embedded or integrated contactless payment chip 110 and antenna 130, such as that described above. As such, the mobile device 500 is provided with optional contactless payment functionality that may include a degree of password protection as will be illustratively described herein with reference to FIGS. 3-5.

FIG. 2 represents a specific example of an electronic device in which contactless payment systems and methods described herein may be implemented. Implementation of such systems and methods in other electronic devices having further, fewer, or different components than those shown in FIG. 2 would occur to one skilled in the art to which this application pertains and are therefore considered to be within the scope of the present application.

Figure 3:
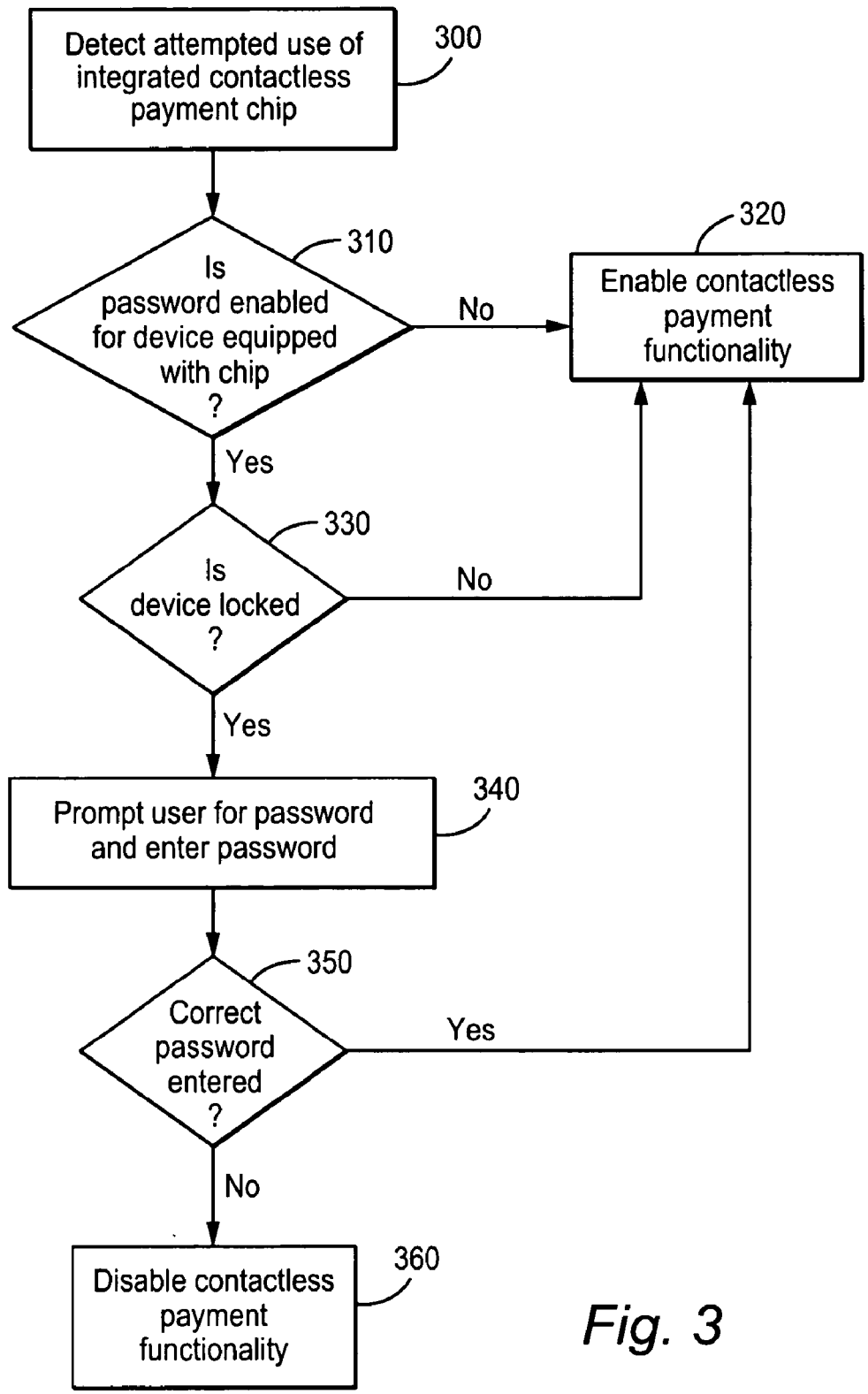
FIG. 3 is a flow diagram illustrating a method of contactless payment authentication according to an exemplary embodiment.

FIG. 3 is a flow diagram illustrating a method of contactless payment authentication according to an exemplary embodiment. In this example, upon detection of an attempted use of a contactless payment chip 300 that is, for example, embedded in a mobile wireless communication device 500, an inquiry is made to determine whether the device 500 has authentication functionality, such as, for example, password protection functionality enabled 310. Detection of an attempted use of the contactless payment chip may be determined in any number of ways, such as, for example, detection of activation of the antenna 130. If, in step 310, it is determined that there is no password protection, or that password protection features are not enabled, the device 500 enables use of the payment functionality of the embedded contactless payment chip 110 to complete the transaction 320. On the other hand, if in step 310 it is determined that the device 500 has enabled password features, the device 500 determines whether the device is locked 330. If the device is not locked, the device 500 enables use of the payment functionality of the embedded contactless payment chip 110 to complete the transaction 320. If the device is locked, the user is prompted to enter the password 340 using, for example, the keyboard 532 of the device 500. As described above, the user may be prompted by any number of methods, such as, for example, vibration of the device, emission of a tone by the device, display of a message on the device screen, a message on the contactless payment reader, etc. If the correct password is entered 350, then the device 500 enables use of the payment functionality of the embedded contactless payment chip 110 to complete the transaction 320. On the other hand, if the incorrect password is entered 350, the device 500 disables use of the contactless payment functions 360. Disabling use of the payment functionality of the chip 110 may be achieved by any number of acceptable means, such as, for example, and without limitation, disabling the antenna 130 so that transmission of payment related data from the chip to the payment terminal 140, smart card reader 770, or the like. Alternatively, a predetermined number of attempts to enter the correct password may be allowed to allow the user some flexibility and to avoid unnecessary denial of access.

In this manner, a certain level of security is provided to the contactless payment functionality via the device 500. This security level is not intrusive and can be set to any level desired by the user. For example, the user may desire no security whatsoever, in which case the user may set the device to not use password protection at all. Alternatively, the device may only be locked at certain times, and may be unlocked for long periods of time. Of course, the device may be locked upon the occurrence of any event, which would provide a very high, albeit somewhat intrusive, level of security. In any event, the level of security is determined based on a comfort level of the user. It will also be understood that the authentication functionality may be implemented in any suitable manner including, but not limited to, being implemented on a processor of the device or a by a server that may run various applications specific to the device or system.

Figure 4:
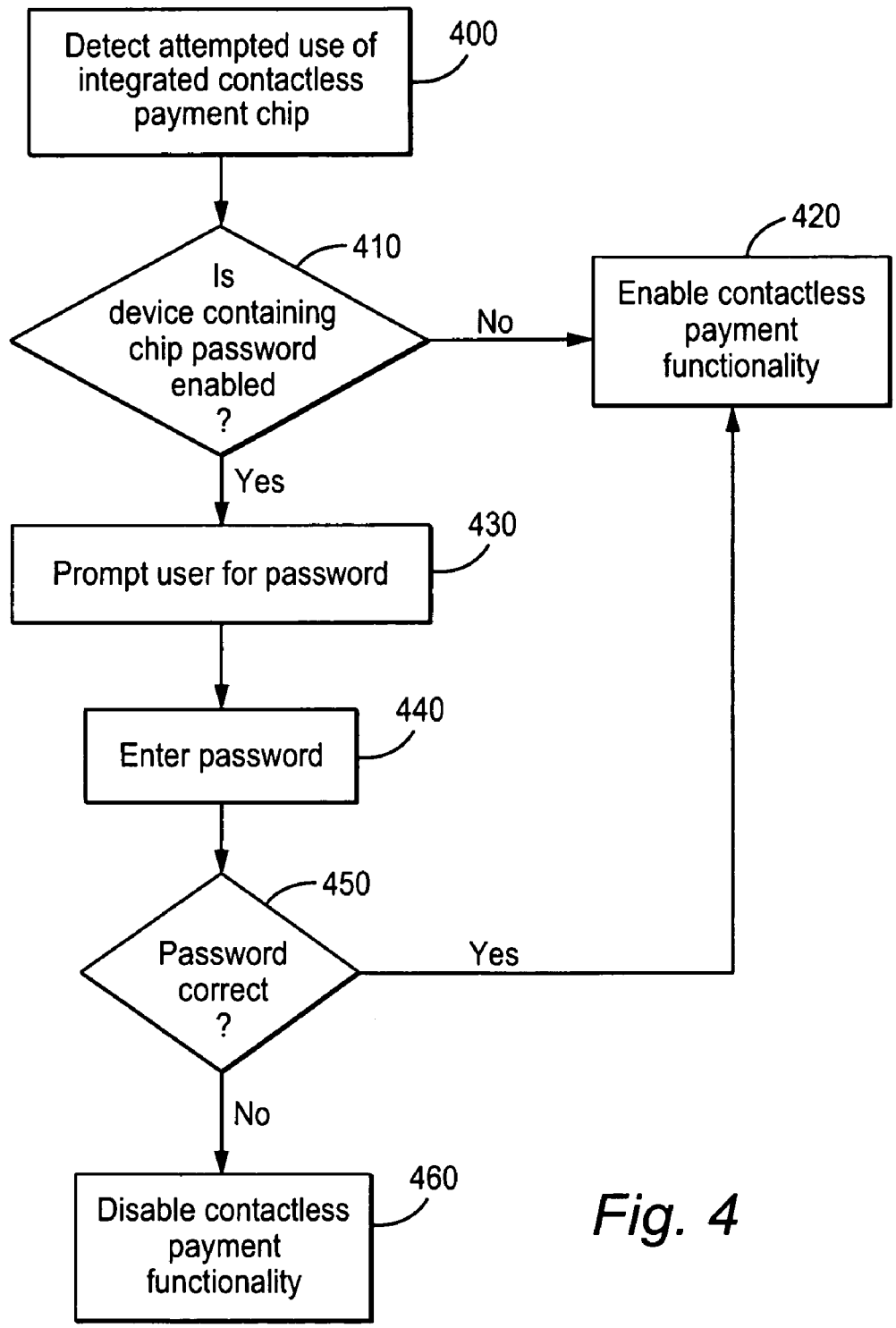
FIG. 4 is a flow diagram illustrating a method of contactless payment authentication according to another exemplary embodiment.

In another embodiment, as illustrated in the flow diagram of FIG. 4, a more intrusive, but highly secure method of contactless payment authentication is disclosed. According to this example, upon detection of attempted use of the embedded contactless payment functionality 400, as described above, a determination is made as to whether the device 500 has authentication functionality, such as, for example, password functionality enabled 410. If password functionality is not enabled or if the device does not have any password functionality, use of the contactless payment functionality is enabled 420. If the device 500 does have password functionality that is enabled 410, the user is prompted for the password 430. As described above, the user may be prompted by any number of methods, such as, for example, vibration of the device, emission of a tone by the device, display of a message on the device screen, a message on the contactless payment reader, etc. After entry of the password 440, it is determined whether the password is correct 450. If the password entered by the user 440 is correct, use of the contactless payment functionality is enabled 420. If the password entered by the user is incorrect, the use of contactless payment functionality is disabled 460. As described above, the system may be designed to allow a predetermined number of password entry attempts prior to disabling the use of contactless payment functionality.

The illustrative example set forth in FIG. 4 is the most secure, but is also the most intrusive and time consuming.

However, for those who value security over convenience and time savings, the solution set forth in this example may be preferred. As set forth above, it will be understood that the authentication functionality may be implemented in any suitable manner including, but not limited to, being implemented on a processor of the device or a by a server that may run various applications specific to the device or system.

Figure 5:
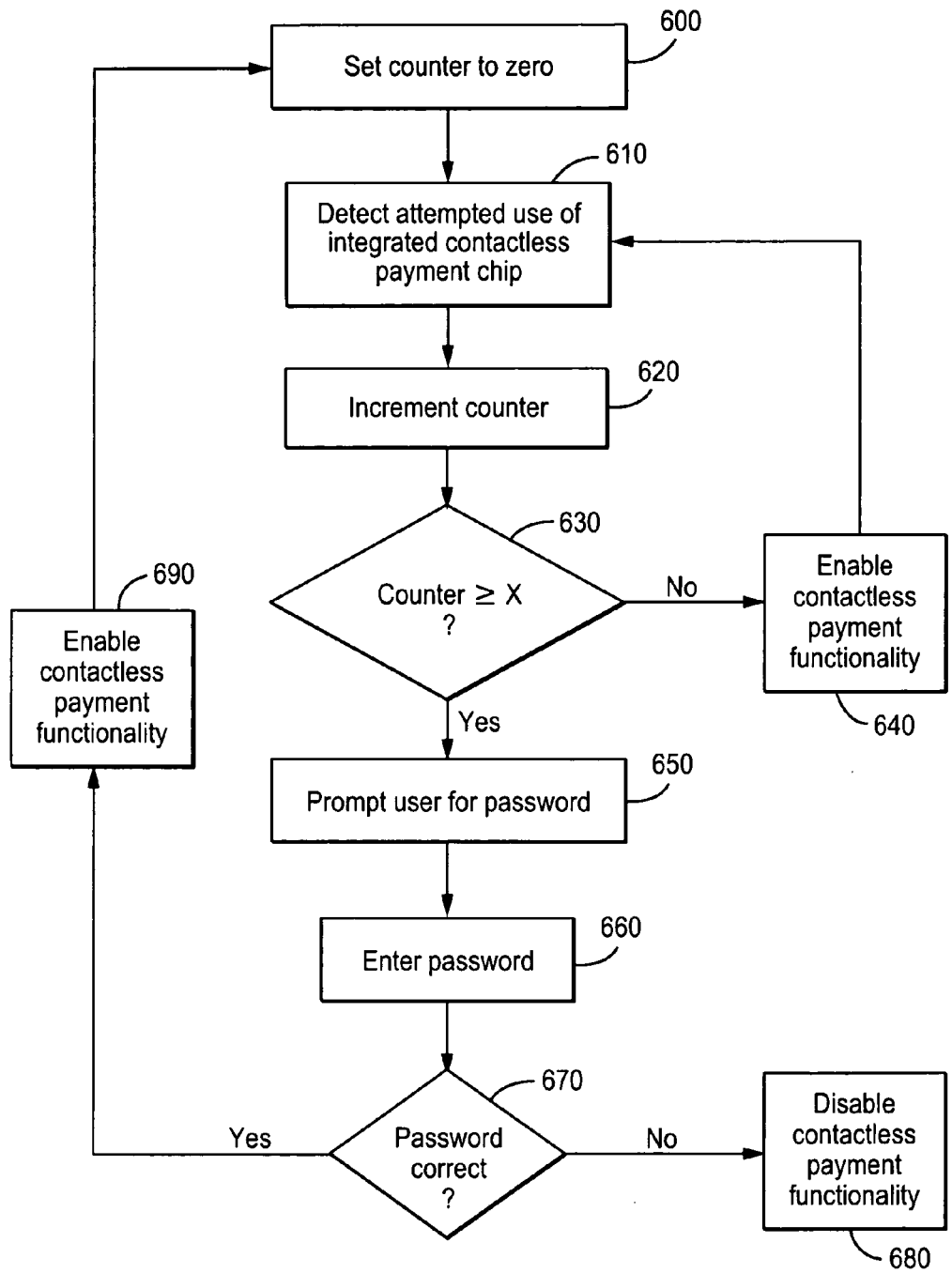
FIG. 5 is a flow diagram illustrating yet another method of contactless payment authentication according to another exemplary embodiment.

Turning now to FIG. 5, another method of contactless payment authentication according to another exemplary embodiment is illustrated. According to this example, the device 500 is set to check for an authentication code, such as, for example, a password upon the detection of a predetermined number of contactless payment attempts. In this manner, a certain level of security is provided wherein limitless unauthorized use of the embedded contactless payment functionality is prevented, while minimizing the intrusiveness and inconvenience that may be associated with password verification of contactless payments. In this example, a counter that keeps track of the number of contactless payment attempts is first set to zero 600. Each time a contactless payment attempt is detected 610 by the device 500, the counter is incremented 620. The counter is checked 630 each time a contactless payment is attempted 610. So long as the counter is determined to be less than a predetermined number 630, use of contactless payment functionality embedded in the device 500 is enabled 640. If the counter is determined to be greater than or equal to the predetermined number of attempts 630, the user is prompted to enter the password 650. As described above, the user may be prompted by any number of methods, such as, for example, vibration of the device, emission of a tone by the device, display of a message on the device screen, a message on the contactless payment reader, etc. After entry of the password 660, it is determined whether the password is correct 670. If the password entered by the user 670 is correct, use of the contactless payment functionality is enabled 690 and the counter is reset to zero 600. If the password entered by the user is incorrect, the use of contactless payment functionality is disabled 680. As described above, the system may be designed to allow a predetermined number of password entry attempts prior to disabling the use of contactless payment functionality.

In this example, the user may have to supply their password once in every predetermined number of contactless payment attempts. Operating the contactless payment system according to this embodiment would reduce user interaction and inconvenience, while at the same time reducing the amount of unlawful or unauthorized usage. As described above, the system may be designed to allow a predetermined number of password entry attempts prior to disabling the use of contactless payment functionality.

Figure 6:
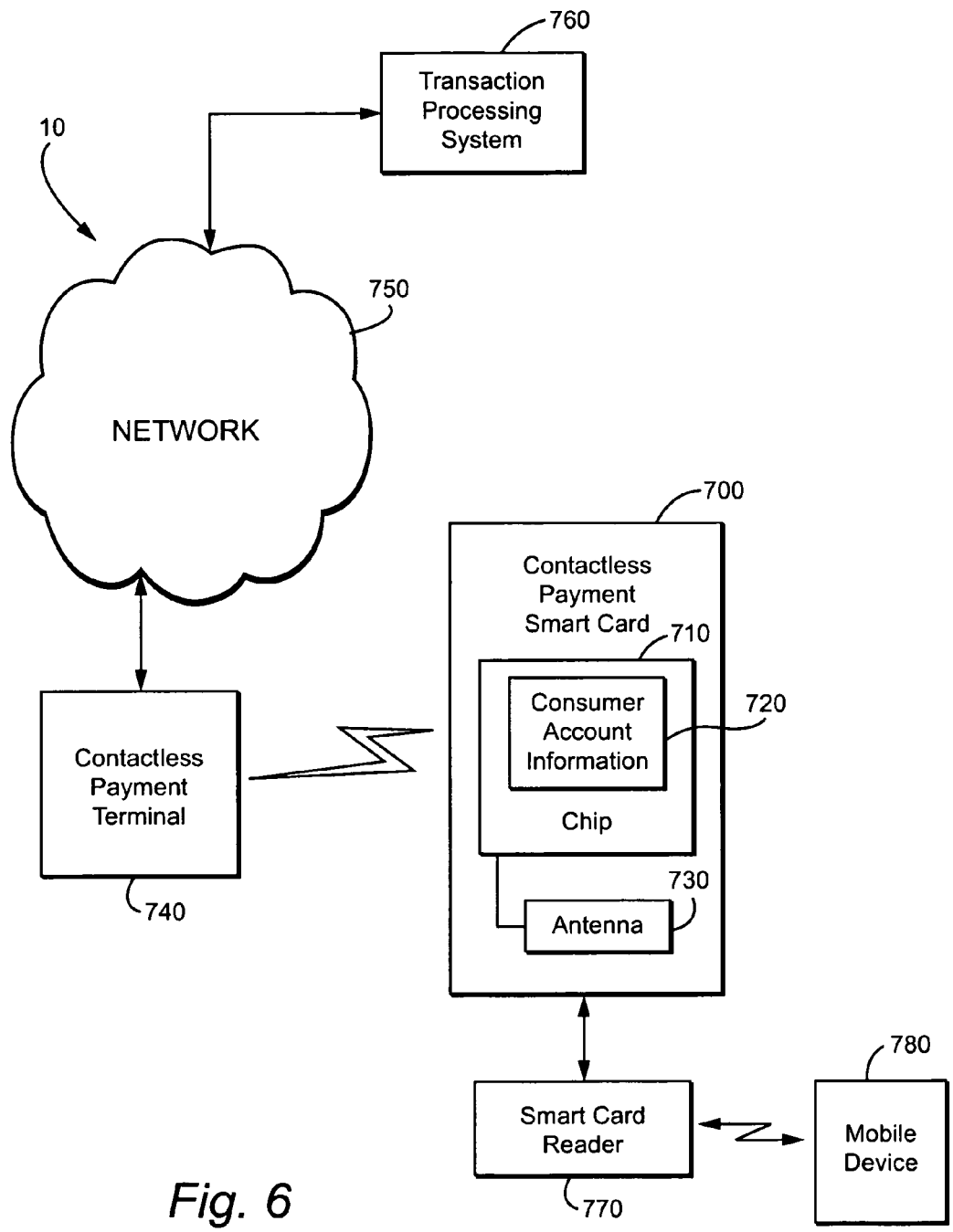
FIG. 6 is an illustrative schematic block diagram of an exemplary contactless payment system employing a smart card and portable smart card reader.

In another example, as illustrated in FIG. 6, contactless payment functionality may be associated with a so-called smart card 700. In this example, the smart card 700 may include a chip 710 that provides contactless payment functionality via consumer account information 710 resident on the chip, and an antenna 730 that is used to transmit information to a contactless payment reader 740. The smart card 700 having contactless payment functionality may be inserted into a smart card reader 770 that is in communication with, for example, a mobile wireless communication device 780 via a wireless connection, such as, for example, a Bluetooth™ connection. Additionally, the smart card reader 770 may be a portable reader that is wearable by the user via, for example, a lanyard (not shown), or the like. When the smart card reader 770 containing the smart card (including contactless payment functionality) 700 is brought in proximity of a contactless payment reader 740, use of the contactless payment functionality may be controlled by the mobile wireless communications device 780 in a manner similar to that described above, by controlling the smart card reader 770 via wireless connection between the smart card reader 770 and the mobile wireless communication device 780. As described above, when the contactless payment terminal 740 receives consumer account information 710 from the smart card 700 via the antenna 730, this information is sent to a transaction processing system 760 over a communication network 750. The transaction processing system 760 authenticates the consumer account information 710 and sends an indication to the contactless payment terminal 740, via the communication network 750, as to whether the transaction is authorized.

As set forth above, security features of the mobile wireless communication device 780 may be used to control the transmission of consumer account information 710 when the smart card reader 770 is in proximity to the contactless payment terminal 740. For example, the mobile wireless communication device 780 may include password functionality that is typically used to enable use of the mobile wireless communications device for features other than contactless payment, such as, for example, locking the mobile wireless communication device 780 keypad. If there is no password set for the mobile wireless communication device 780, then the payment functionality of the contactless payment chip is always enabled for use. However, if the password of the mobile electronic communication device 780 is set, use of the payment functionality of the contactless payment chip 710 may be disabled via the smart card reader 770 when the mobile wireless communication device 780 is locked. If the mobile wireless communication device 780 is in an unlocked condition, contactless payment functionality is enabled for use by the smart card reader 770. In the situation where contactless payment is attempted, but the mobile wireless communication device 780 is locked, the user may be prompted by any number of means, such as, for example, vibration, tone or message on a screen of the mobile wireless communication device 780, or an indication from the contactless payment reader 740, to enter the appropriate password to unlock the device via the smart card reader 770 and enable contactless payment. If the correct password is not entered for a predetermined number of attempts, the contactless payment functionality is disabled and the transaction is not completed. It will be understood that other security schemes using the security features of the mobile wireless communication device may be used, and other uses of the password functionality, such as those described above in connection with different exemplary embodiments may be used, such as, for example, those described above in connection with FIGS. 3-5.

While this disclosure describes specific exemplary embodiments, it is evident that many alternatives, modifications and variations will be apparent to those skilled in the art. Accordingly, the exemplary embodiments described herein, are intended to be illustrative, not limiting. Various changes may be made without departing from the true spirit and full scope of the invention, as defined in the following claims.

What is claimed is:

1. A non-transitory computer-readable medium containing computer-executable instructions that, when performed by a processor in an electronic device, cause the processor to:
    enable restriction of use of the electronic device by way of an authentication function;
    enable a contactless payment circuit of the electronic device to provide data for a contactless payment transaction based on an authorized use status of the electronic device, the authorized use status corresponding to whether use of the electronic device has been restricted via the authentication function; and disable the contactless payment circuit.

2. The non-transitory computer-readable medium of claim 1 wherein the processor is further caused to determine the authorized use status at the electronic device.

3. The non-transitory computer-readable medium of claim 1 wherein the contactless payment circuit is configured to enable provision of data for the contactless payment transaction further based on an attempted use of the contactless payment circuit for making a payment.

4. The non-transitory computer-readable medium of claim 1 wherein the authentication function is configured to receive an authentication token from a keyboard of the electronic device.

5. The non-transitory computer-readable medium of claim 1 wherein the data comprises information that can be used by a transaction processing system to process the contactless payment transaction.

6. The non-transitory computer-readable medium of claim 1 wherein the authentication function is implemented based on user input.

7. The non-transitory computer-readable medium of claim 1 wherein the authentication function is implemented using a password.

8. The non-transitory computer-readable medium of claim 1 wherein the authentication function is implemented using a personal identification number.

9. The non-transitory computer-readable medium of claim 1 wherein the processor is further caused to perform the disabling upon determining a change in authorized use status of the electronic device to a restricted status.

10. The non-transitory computer-readable medium of claim 1 wherein the processor is further caused to disable by disabling an antenna.

11. The non-transitory computer-readable medium of claim 10 wherein the antenna is configured for communication with a payment terminal.

12. A non-transitory computer-readable medium containing computer-executable instructions that, when performed by a processor in an electronic device, cause the processor to:
enable restriction of use of the electronic device by way of an authentication function; and
enable a contactless payment circuit of the electronic device to provide data for a contactless payment transaction based on an authorized use status of the electronic device, the authorized use status corresponding to whether use of the electronic device has been restricted via the authentication function;
wherein the contactless payment circuit is enabled to provide data to a transaction processing system when the electronic device is authorized for use by the authentication function.

13. The non-transitory computer-readable medium of claim 12 wherein the processor is further caused to disable the contactless payment circuit when the electronic device is not authorized for use by the authentication function.

14. The non-transitory computer-readable medium of claim 12 wherein the processor is further caused to detect, when the contactless payment circuit is disabled, an attempted use of the contactless payment circuit for making a payment and arrange display of a prompt for receiving an authentication token to enable use of the electronic device by the authentication function.

15. The non-transitory computer-readable medium of claim 14 wherein the processor is further caused to enable the disabled contactless payment circuit when a correct authentication token is received.

16. A non-transitory computer-readable medium containing computer-executable instructions that, when performed by a processor in an electronic device, cause the processor to:
enable restriction of use of the electronic device by way of an authentication function; and
enable a contactless payment circuit of the electronic device to provide data for a contactless payment transaction based on an authorized use status of the electronic device, the authorized use status corresponding to whether use of the electronic device has been restricted via the authentication function;
wherein the contactless payment circuit is disabled when the electronic device is not authorized for use by the authentication function.

17. The non-transitory computer-readable medium of claim 16 wherein the authentication function is configured to receive an authentication token from a keyboard of the electronic device.

18. The non-transitory computer-readable medium of claim 16 wherein the authentication function is implemented based on user input.

19. A non-transitory computer-readable medium containing computer-executable instructions that, when performed by a processor in an electronic device, cause the processor to:
enable restriction of use of the electronic device by way of an authentication function;
enable a contactless payment circuit of the electronic device to provide data for a contactless payment transaction to a contactless payment reader based on an authorized use status of the electronic device, the authorized use status corresponding to whether use of the electronic device has been restricted via the authentication function;
track a number of attempted uses of the contactless payment circuit; and
require entry of an authentication token to enable use of the contactless payment circuit based on the number of attempted uses exceeding another number of attempted uses of the contactless payment circuit.

20. A non-transitory computer-readable medium containing computer-executable instructions that, when performed by a processor in an electronic device, cause the processor to:
detect, responsive to a contactless payment circuit in the electronic device becoming proximate to a contactless payment terminal, an attempted activation of the contactless payment circuit;
determine an authorized use status of the electronic device, the authorized use status corresponding to whether use of the electronic device has been restricted; and
enable the contactless payment circuit to provide data to the contactless payment terminal based on the authorized use status of the electronic device.

21. The non-transitory computer-readable medium of claim 20 wherein the contactless payment circuit is enabled to provide data to the contactless payment terminal when an authentication function of the electronic device is not enabled and when the electronic device is authorized for use by the authentication function.

22. The non-transitory computer-readable medium of claim 21 wherein the processor is further caused to disable the contactless payment circuit when the authentication function of the electronic device indicates that the electronic device is not authorized for use.

23. The non-transitory computer-readable medium of claim 21 wherein the electronic device is authorized for use based on entry of a password.

24. The non-transitory computer-readable medium of claim 23 wherein the processor is further caused to:
   track a number of attempted uses of the contactless payment circuit; and
   require entry of the password to enable use of the contactless payment circuit based on the number of attempted uses exceeding a predetermined number of attempted uses of the contactless payment circuit.

25. The non-transitory computer-readable medium of claim 23 wherein the authentication function is configured to receive the password from a keyboard of the electronic device.

26. A non-transitory computer-readable medium containing computer-executable instructions that, when performed by a processor in an electronic device, cause the processor to:
   detect, responsive to a contactless payment circuit in the electronic device becoming proximate to a reader, an attempted activation of the contactless payment circuit;
   determine an authorized use status of the electronic device, the electronic device operably coupled to a smart card reader to which the contactless payment circuit is operably coupled; and
   enable the contactless payment circuit to provide, via the smart card reader, data to the reader based on the authorized use status of the electronic device.

27. The non-transitory computer-readable medium of claim 26 wherein the contactless payment circuit is enabled to provide data to the reader when an authentication function of the electronic device is not enabled and when the electronic device is authorized for use by the authentication function.

28. The non-transitory computer-readable medium of claim 27 wherein the contactless payment circuit is disabled when the authentication function of the electronic device indicates that the electronic device is not authorized for use.

29. The non-transitory computer-readable medium of claim 26, wherein the electronic device is authorized for use based on entry of a password.

30. The non-transitory computer-readable medium of claim 29 wherein the processor is further caused to:
   track a number of attempted uses of the contactless payment circuit; and
   require entry of the password to enable use of the contactless payment circuit based on the number of attempted uses exceeding a predetermined number of attempted uses of the contactless payment circuit.

* * * * *